Aug. 7, 1951  B. N. ASHTON  2,562,875
INLET WATER VALVE FOR AUTOMATIC WASHING MACHINES
Filed May 7, 1946

INVENTOR.
BENJAMIN N. ASHTON
BY Campbell Brumbaugh + Free
his ATTORNEYS

Patented Aug. 7, 1951

2,562,875

UNITED STATES PATENT OFFICE 2,562,875

INLET WATER VALVE FOR AUTOMATIC WASHING MACHINES

Benjamin N. Ashton, Kingston, N. Y., assignor to Electrol Incorporated, Kingston, N. Y., a corporation of Delaware Application May 7, 1946, Serial No. 667,932

5 Claims. (Cl. 236—12)

This invention relates to valves, and it relates more particularly to valves whereby the temperature of a liquid delivered by the valve may be controlled and regulated.

An object of the invention is to provide a valve by means of which liquid can be delivered selectively at either of two desired temperatures.

Another object of the invention is to provide a valve which may be controlled electrically to cause hot and cold liquids to be mixed and to be discharged at different preselected temperature.

Other objects of the invention will become apparent from the following description of a typical form of valve embodying the present invention.

In accordance with the present invention, a valve is provided into which separate streams of hot and cold liquid are delivered and which has separate outlets through which liquid may be discharged selectively, the liquid issuing from the separate outlets having different predetermined temperatures.

More particularly, valves of the type embodying the present invention are provided with a pair of inlets, one for hot liquid and one for cold liquid, and two discharge outlets for the liquids. Interposed between the inlets and the outlets is a mixing chamber for the liquids into which the two streams of liquid are delivered through a pair of thermostatically controlled valves, these valves being so arranged that when the liquid is discharged through one outlet, the proportions of the liquid are controlled by the valves to maintain the liquid at one temperature such as, for example, 100° F. When the liquid is discharged through the other outlet, the thermostatically controlled valves are adjusted automatically to cause the mixed liquids to be discharged at a different temperature such as, for example, 130° F.

Control of the flow of liquid through the discharge outlets is attained selectively by electrically actuated valves which can be opened and closed from a remote point and thereby select the desired temperature without the necessity of the use of thermometers or the like to determine the exact temperature of the liquid. Such valves have many usages, such as, for example, in regulating the temperature of water supplied to a clothes washing machine, a dishwashing machine, or the temperature of liquids in chemical processes and the like.

Figure 1:
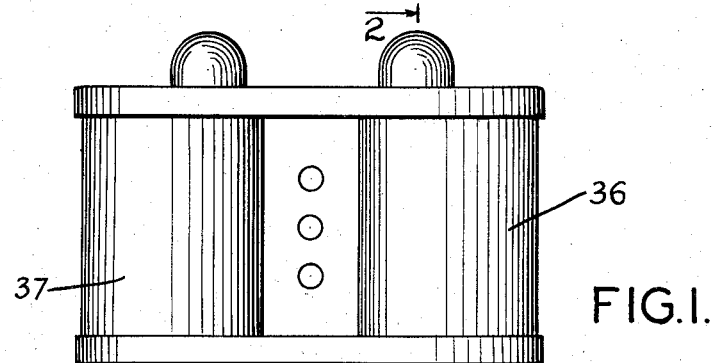
Figure 2:
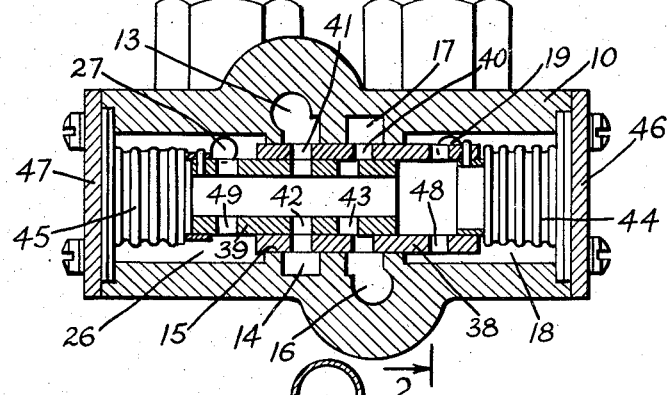
Figure 2:
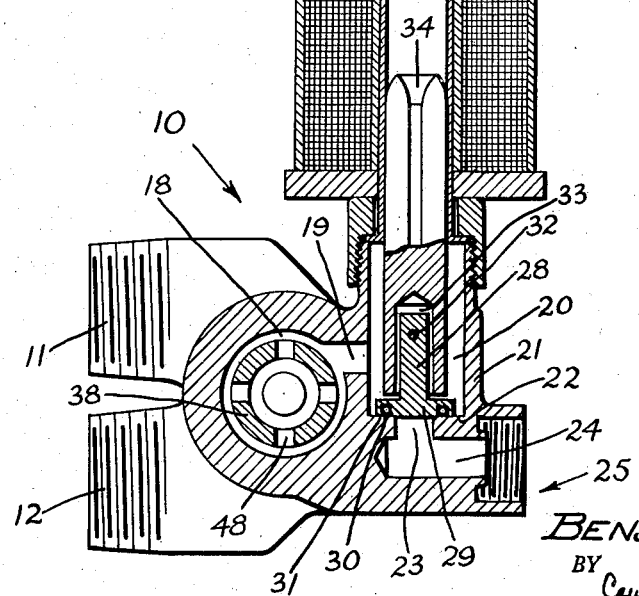

For a better understanding of the present invention, reference may be had to the acompanying drawings in which:

Figure 1 is a view in front elevation of a typical form of valve embodying the present invention with the valve housing shown in section; and Figure 2 is a view in section taken on line 2—2 of Figure 1.

The form of valve chosen for purposes of illustration is one that is suitable for use with a washing machine for controlling the temperature of the water supplied thereto. Such valves may be used for other purposes and the proportions and shape of the elements may be modified as the purpose demands. The valve illustrated in Figures 1 and 2 includes a generally cylindrical, hollow, valve casing 10 having rearwardly projecting inlet couplings 11 and 12 thereon through which hot and cold liquids, such as, hot and cold water, are supplied separately. The liquid from the inlet 11 is delivered through a bore or passage 13 to a groove 14 (Figure 1) formed in the inner surface of a generally cylindrical valve seat 15 in the interior of the casing 10.

The liquid from the inlet coupling 12 is delivered through a passage 16 into a groove 17 also formed in the seat 15 of the valve, the grooves 14 and 17 being spaced apart axially of the chamber 10.

As shown in Figures 1 and 2, the chamber 18 at the right hand end of the casing 10 communicates through a horizontal bore 19 with an enlarged vertical bore 20 in a boss 21 extending laterally from the casing 10. The bore 20 terminates at a shoulder 22 between the bore 20 and the reduced passage 23 which is connected with a right angularly related passage 24 in an outlet coupling 25.

The chamber 26 at the left hand side of the valve seat 15 communicates with a similar discharge outlet or coupling, not shown, through a passage 27 and a bore similar to the bore 20 shown in Figure 2.

The flow of liquid through each of the discharge outlets is controlled by means of suitable electrically actuated valves which are substantially identical. Only one of these valves is disclosed in detail in Figure 2. The valve consists of a valve plug 28 having a disk-like head portion 29 that is provided in its face with an annular groove 30. A resilient toroidal ring 31 is mounted in the groove 30 and projects slightly therefrom in order to engage and form a seal with the valve seat 22. The plug 28 is supported by means of a pivot pin 32 in a recess 33 extending axially of a solenoid armature 34 which is slidably received in a metallic tubular member 35. The upper end of the tubular member 35 is closed and in order to prevent the trapping of air or liquid in the tube 35, the armature 34 preferably is non-circular in cross section.

The tube 35 is surrounded by a solenoid 36 which may be connected by suitable conductors to a manually operated switch and a source of electrical energy whereby upon closing of the switch the solenoid 36 is energized and the armature 34 is drawn upwardly thereby unseating the valve plug 29 and allowing liquid to flow from the chamber 18 to the discharge outlet 25. The pivotal support for the plug 29 permits it to seat itself accurately on the seat 22.

Discharge of liquid from the chamber 26 is controlled by means of the solenoid 37 and an associated valve element, not shown, which are like the valve assembly disclosed in Figure 2. Thus, by closing either of the switches, the liquid in the chambers 18 or 26 and supplied through the inlets 11 and 12 may be discharged selectively through one of the outlets.

The temperature of the liquid discharged from one outlet and the temperature of the liquid discharged from the other outlet are controlled by means of a pair of telescoped tubular slide valves 38 and 39. The slide valve 38 is mounted slidably in the valve seat 15 and is provided with orifices 40 and 41 through which liquid may flow from both the inlets 11 and 12. Both of the orifices may be aligned with the inlets 11 and 12 simultaneously.

The slide valve 39 is telescopically and slidably mounted within the slide valve 38 and is provided with orifices 42 and 43 which are spaced a lesser distant apart than the orifices 40 and 41 of the slide valve 38. Therefore, when the orifice 42 is aligned with the orifice 41, for example, the orifice 43 is substantially completely out of alignment with the orifice 40.

The ratio between the rates of flow of the hot and cold liquid into the interior of the valves 38 and 39 is determined by the relative position of the two slide valves 38 and 39 with respect to each other and with respect to the grooves 14 and 17.

The positions of the slide valves 38 and 39 are controlled by the temperature-responsive bellows 44 and 45 which are fixed respectively to the ends of the slide valves 38 and 39 and are mounted in grooves between detachable end closure plates 46 and 47 and the ends of the casing 10.

The liquid can flow from the interior of the valves 38 and 39 to the chambers 18 and 26 through the holes 48 and 49 in the outer ends of the valves 38 and 39, respectively, these holes always being so located as to be in communication with their respective chambers.

By regulating the expansion and contraction of the bellows 44 and 45 the temperature of the liquid discharged from the chamber 18 may be regulated to one predetermined temperature, for example, 100° F. while the liquid discharged from the chamber 26 may be regulated to a higher temperature, for example, 130° F. This temperature regulation is, of course, due to the fact that the ratio of the hot and cold water entering the chambers 18 and 26 is controlled by shifting the positions of the valves 38 and 39 in response to the expansion and contraction of the bellows 44 and 45. When the valve is to be used, the inlets 11 and 12 are connected respectively to the hot water line and the cold water line of a water system. At the beginning of an operation, the valve elements 38 and 39 are in the position shown with the ports 41 and 42 in alignment so that the hot water can flow into the valve while the flow of cold water from the inlet 12 is substantially shut off because the ports 40 and 43 in the valve are almost out of alignment. If the solenoid 37 is energized to open the corresponding valve, the hot water flows through the inner slide valve 39 out through the ports 49, around the bellows 45 and through the passage 27 to the discharge outlet 24. The flow of hot water around the bellows 45 causes it to expand, thereby moving the sleeve valve 39 so as to shut off at least partially the flow of hot water through the ports 42 and allowing a larger amount of cold water to flow through the inlet passage 16 around the groove 17 and through the ports or openings 40 and 43. The mixing of the cold water with the hot water reduces the temperature of the water flowing through the port 27 and also the temperature of the water surrounding the bellows 45. As a result, the bellows 45 contracts slightly and this operation continues until a constant temperature of water is produced by the mixing of the hot and the cold water.

A similar action takes place when the solenoid 36 is energized. The hot water from the passage 13 flows into the chamber 18 around the bellows 44 and out through the passage 19 to the discharge outlet. This causes expansion of the bellows 44 with the result that the amount of hot water flowing through the passage 13 is decreased and the amount of cold water flowing through the passage 16 is increased. By regulating the extent of expansion of the bellows 44 and 45, it is possible to arrange the relationships of the slide valves 38 and 39 so that water or other liquid at one temperature is discharged through one outlet and water or other liquid at a different temperature is discharged through the other outlet.

It will be understood that the liquid will flow through one or the other outlets only when the corresponding solenoid 36 or 37 is energized so that selection can be made of the temperature of the liquid being discharged as desired.

It will be understood that the valve illustrated is susceptible to considerable modification, for example, in the type of electrical mechanism for actuating the valve 29; the valve 29 itself may take other forms than that disclosed; and the size and position of the elements may be modified as desired. Therefore, the form of the invention described above should be considered as illustrative and not as limiting the scope of the following claims.

I claim:

1. A device for dispensing liquid at two different temperatures comprising a hollow valve casing, a pair of inlets communicating with the interior of said casing adjacent to its midportion, a pair of outlets communicating with the interior of said casing on opposite sides of said inlets, a pair of tubular telescoped valve slidable in said casing between said outlets and having unequally spaced apart pairs of ports therein movable into and substantially out of alignment to vary the ratio of hot liquid to cold liquid flowing from said inlets to said outlets for changing the proportionate flow of liquid through said inlets, a pair of expansible temperature-responsive means in said casing, one of said means being connected to one of said tubular valves and in the path of flow from said inlets to one outlet, and the other of said means being connected to the other tubular valve and in the path of flow from said inlets to the other outlet, and valve means for selectively directing said liquids from said inlets to either of said outlets.

2. A device for dispensing liquid at two different temperatures comprising a hollow valve casing having a centrally-located cylindrical valve seat therein, and chambers at opposite ends of said seat, a pair of inlets for receiving liquid having ports in spaced relationship axially of said valve seat, discharge ports communicating with said chambers, control valves interposed between said chambers and said discharge ports permitting discharge of said liquid selectively from said outlets, a first tubular valve seated in said valve seat and having axially spaced openings therein for alignment with said valve seat ports, a second tubular valve telescoped within said first tubular valve and having openings therethrough spaced a different distance apart than the openings in said first tubular valve and movable into and out of alignment with the openings in the first tubular valve to vary the proportions of the liquids passing through said openings, and temperature-responsive bellows in each of said chambers, one of said bellows being connected to said first tubular valve, and another of said bellows being connected to said second tubular valve member.

3. A valve for dispensing liquids at two different temperatures comprising a casing having two inlets, two outlets and a pair of chambers, each chamber communicating with a different one of said outlets for receiving liquid from said inlets and discharging it to the corresponding outlet, separate means interposed between each chamber and its corresponding outlet for connecting and disconnecting them selectively, a separate temperature-responsive element in each chamber, each elements being responsive to the temperature of the liquid in its corresponding chamber, and a pair of relatively movable valve members, each connected to and movable in response to one of said temperature-responsive elements, said valve members having unequally spaced ports therein to regulate the proportions of the liquid supplied to said chambers from said two inlets, thereby to supply liquid at one temperature to one outlet and liquid at another temperature to the other outlet.

4. A device for dispensing liquid at two different temperatures comprising a hollow valve casing, a pair of spaced apart inlets communicating with the interior of said casing, a pair of spaced apart outlets communicating with the interior of said casing, a pair of overlapping slide valves movable in said casing between said inlets and said outlets and having unequally spaced apart pairs of ports therein movable into and substantially out of alignment to vary the ratio of hot liquid to cold liquid flowing from said inlets to said outlets for changing the proportion of flow of liquid through said inlets, a pair of expansible temperature-responsive means in said casing, one of said means being connected to one of said slide valves and in the path of flow from said inlets to one outlet, and the other of said temperature-responsive means being connected to the other valve and in the path of flow from said inlets to the other outlet, and valve means for selectively directing said liquids from said inlets to either of said outlets.

5. A device for dispensing liquid at two different temperatures comprising a hollow valve casing having a centrally located valve seat therein, and chambers at opposite ends of said seat, a pair of inlets for receiving liquid having ports in spaced relationship axially of said valve seat, discharge ports communicating with said chambers, control valves interposed between said chambers and said discharge ports permitting discharge of said liquid selectively from said outlets, a first slide valve seated in said valve seat and having axially spaced openings therein for alignment with said valve seat ports, a second slide valve overlapping said first tubular valve and having openings therethrough spaced a different distance apart than the openings in said first valve and movable into and out of alignment with the openings in the first valve to vary the proportions of the liquids passing through said openings, and temperature-responsive members in each of said chambers, one of said members being connected to said first valve, and another of said members being connected to said second valve member.

BENJAMIN N. ASHTON.

REFERENCES CITED

The following references are of record in the file of this patent:

UNITED STATES PATENTS

| Number | Name | Date |
|---|---|---|
| 775,021 | Waterman | Nov. 15, 1904 |
| 1,925,686 | Chism | Sept. 5, 1933 |
| 2,110,952 | Glenn | Mar. 15, 1938 |
| 2,296,266 | Breckenridge | Sept. 22, 1942 |
| 2,425,788 | Edwards | Aug. 19, 1947 |